US009256472B2

(12) United States Patent
Kakade et al.

(10) Patent No.: US 9,256,472 B2
(45) Date of Patent: Feb. 9, 2016

(54) SYSTEM AND METHOD FOR ECONOMICAL MIGRATION OF LEGACY APPLICATIONS FROM MAINFRAME AND DISTRIBUTED PLATFORMS

(75) Inventors: Sunilkumar Narayan Kakade, Gilberts, IL (US); Philip Shelley, Highwood, IL (US); Susan S. Hsu, Hoffman Estates, IL (US)

(73) Assignee: Sears Brands, LLC, Hoffman Estates, IL (US)

( * ) Notice: Subject to any disclaimer, the term of this patent is extended or adjusted under 35 U.S.C. 154(b) by 571 days.

(21) Appl. No.: 13/545,243

(22) Filed: Jul. 10, 2012

(65) Prior Publication Data

US 2014/0019977 A1 Jan. 16, 2014

(51) Int. Cl.
*G06F 9/46* (2006.01)
*G06F 9/50* (2006.01)
*G06F 9/44* (2006.01)

(52) U.S. Cl.
CPC .............. *G06F 9/5072* (2013.01); *G06F 8/72* (2013.01)

(58) Field of Classification Search
USPC ........................................................ 718/101
See application file for complete search history.

(56) References Cited

U.S. PATENT DOCUMENTS

| 6,035,380 A | 3/2000 | Shelton | |
| 7,831,636 B2 * | 11/2010 | Wietlisbach et al. | 707/803 |
| 2003/0055921 A1 | 3/2003 | Kulkarni | |
| 2003/0074600 A1 | 4/2003 | Tamatsu | |
| 2008/0209392 A1 | 8/2008 | Able | |
| 2008/0270487 A1 | 10/2008 | Weijun | |
| 2009/0240704 A1 | 9/2009 | Zimowski | |
| 2009/0241118 A1 | 9/2009 | Lingamneni | |
| 2011/0055559 A1 | 3/2011 | Li | |
| 2013/0167151 A1 * | 6/2013 | Verma et al. | 718/102 |
| 2013/0290976 A1 * | 10/2013 | Cherkasova et al. | 718/104 |
| 2013/0305242 A1 * | 11/2013 | Wang et al. | 718/1 |
| 2014/0019987 A1 * | 1/2014 | Verma et al. | 718/103 |

OTHER PUBLICATIONS

Gates et al. "Building a HighLevel Dataflow System on top of MapReduce: The Pig Experience", ACM 2009, 12 pages.*
Pastorelli, M. et al., HFSP: Size-based Scheduling for Hadoop, IEEE International Conference on Big Data, 2013, pp. 51-59 (9 pages).
PCT, Notification of Transmittal of the International Search Report and the Written Opinion of the International Searching Authority, or the Declaration, in International application No. PCT/US13/48926, dated Jan. 22, 2014. (13 pages).

(Continued)

*Primary Examiner* — Van Nguyen
(74) *Attorney, Agent, or Firm* — McAndrews, Held & Malloy, Ltd.

(57) ABSTRACT

An economical system and method of migrating legacy applications running on proprietary mainframe computer systems and distributed networks to commodity hardware-based software frameworks, by offloading the batch processing from the legacy systems, and returning the resultant data to the original legacy system to be consumed by the unaltered applications. An open source code tool is used to transfer the software, and rewrite it on a faster and more economical hardware system, while leaving a seamless integration of offloaded processing with existing batch processing flow.

19 Claims, 8 Drawing Sheets

(56) References Cited

OTHER PUBLICATIONS

Michiardi, P. et al., Shared Cluster Scheduling: a Fiar and Efficient Protocol. Jun. 2011 [retrieved on Jan. 6, 2014: <http://citeseerx.ist.psu.edu/viewdoc/download?rep=rep1&type=pdf&doi=10.1.1/224/936->; section 1] (5 pages).

Malaiyandisamy, G. et al., Optimizing Batch Window by Leveraging Grid Workflows, SETLabs Briefings, Infosys Technologies Limited, vol. 7, No. 1, 2009, pp. 81-89. (10 pages).

Gray, J. et al., Desktop Batch Processing, San Francisco Systems Center, Digital Equipment Corporation, Compcon Spring '94, Digest of Papers, 1994, pp. 206-211 (6 pages).

PCT, Notification Concerning Transmittal of International Preliminary Report on Patentability, in Application No. PCT/US13/048926, dated Jan. 22, 2015. (7 pages).

* cited by examiner

SYSTEM AND METHOD FOR ECONOMICAL MIGRATION OF LEGACY APPLICATIONS FROM MAINFRAME AND DISTRIBUTED PLATFORMS

FIELD OF THE DISCLOSURE

The present disclosure relates generally to an economical method of migrating legacy applications running on proprietary systems, by offloading the batch processing from the legacy systems onto commodity hardware-based software frameworks, and returning the resultant data to the original legacy system to be consumed by the unaltered applications.

BACKGROUND

Batch processing has been associated with mainframe computers since the earliest days of electronic computing. Many organizations still rely upon mainframe computers or Unix-based infrastructures for batch processing applications, such as those run at the end of each business day. These applications are known to use a great deal of processing capacity, which is typically more expensive on such proprietary computing systems compared with similar processing capacity on commodity hardware systems. As businesses' reliance upon computer applications increase, there is an ever-increasing demand for server space, requiring companies to invest in additional servers.

As more computing applications are being used by companies, the new applications are increasingly tied to existing programs and business processes. Such interdependence upon a particular structure of computing platforms often makes updating the computing platform, or modernizing the legacy applications, more expensive if not altogether infeasible. A typical structure of legacy applications and their relationship to other computing systems, is shown in FIG. 1 as system 100. In this example, system 100 includes separate computing systems for a user interface 102, data sources 104, batch processing 106, and external systems/data warehouse 108. The user 110 communicates with the system 100 through user interface 102. User interface 102 is in electronic communication with data sources 104. Data sources 104 provides input to, and receives resultant data from, batch processing 106. External systems/data warehouse 108 also receives resultant data from batch processing 106. Using current technology, if a company would like to update their batch processing capability, there is a significant investment in computer re-programming, and frequently all four of these different system components (102, 104, 106, and 108) must be updated with costly rewrites of computer code, to be able to work with the new batch processing program. Furthermore, there is also a risk of missing timelines due to unknown application logic conversion issues with user interfacing systems.

One known solution is exemplified by the system 100' illustrated in FIG. 2. In this example, when the computer code of batch processing 106' is changed or updated, the computer code in other parts of system 100' must also be updated in order to communicate and effectively work with the new computer code of batch processing 106', including user interface 102', data sources 104', and external systems/data warehouse 108'. Such an investment in computer programming cost must be weighed against the benefit of investing in a new batch processing system, in a total cost of ownership ("TCO") analysis. Often the reprogramming cost results in a higher TCO, thus preventing companies from being able to enjoy such higher processing speeds. This problem only grows over time, as more applications come online that are tied to such legacy systems, making switching ever more costly.

Even with these barriers, there are some existing solutions to assist companies in reducing their reliance on costly legacy applications. In addition to rewriting the system as illustrated in FIG. 2, one current known solution offered in the marketplace, or discussed in research, calls for conversion of end-to-end applications and hosting to new software platforms. Most of the methods recommend moving applications to distributed platforms involving the licensed software and hardware such as to distributed platforms involving licensed software and hardware such as Oracle/DB2 running on Unix-based servers.

One such solution is a program called NeoBatch by Alchemy Solutions, a Microsoft gold-certified partner for migrating mainframe computing applications that use the Microsoft Windows platform. NeoBatch utilizes Windows servers for additional computing power, and a SQL server database for data storage. However, the user organization must purchase the proprietary software, and its use may require conversion of code for other applications, including user interface applications, to Windows processing platform .NET. Furthermore, the batch processing system may need to be converted to computing language NeoCOBOL to effectively communicate with Windows servers. The reliance on additional Microsoft compatible software may require a company to purchase additional licenses, which adds to the TCO. Also, the case studies showing it use, have not proven its effectiveness on migration of over 1000 million instructions per second ("MIPS") processing requirements.

Another known solution, as exemplified by the article "Shared Cluster Scheduling: a Fair and Efficient Protocol," by P. Michiardi, A. Barbuzzi, and D. Carra, 2011, teaches a scheduling algorithm for a fair resource allocation and jobs optimization in a shared cluster. However, there are limits to the benefits of optimization and resource allocation within a mainframe computer or Unix-based infrastructure, and it may not be available in all cases, such as when the mainframe is already running at capacity.

Another potential solution to high computer processing requirements is Grid technology. Grid technology is a software framework that uses other computers' processing capacity, which are connected to a network. This technology is exemplified by SETI@home, the search for extraterrestrial life institute, which utilizes thousands of internet-connected computers to process collected data. (See, e.g., "Optimizing Batch Window by Leveraging Grid Workflows," G. Malaiyandisamy, B. Gurna and M. Rani, 2009.) However, such technology requires an investment in additional servers and "middleware," software used to manage workflow among a network of computers. Like other solutions, this also adds cost, and may not have a lower TCO. Unlike SETI, companies may not be able to use the computing capacity of other computers for free.

Commodity hardware systems are often times a lower cost framework for computer processing, and do not rely upon a proprietary mainframe computer or a Unix-based infrastructure. It has long been known that such systems may be capable of performing batch processing at a reduced cost, but the method for doing so remains elusive. (See Gray, J. and Nyberg, C., "Desktop Batch Processing," In Proceedings of COMPCON 94, 1994.) Furthermore, there are known risks in attempting such a feat, including missing software components, and interfaces with other systems. (Id.)

As an alternative to modernizing legacy systems, there is a need for migrating resource intensive batch processing of data currently processed on legacy mainframe systems to lower cost commodity hardware systems, while at the same time maintaining existing user interface, data source, and external systems. Such a system would reduce computer processing costs, while maintaining the complex user interfaces and business logic systems that are used on existing platforms.

DETAILED DESCRIPTION

Reference will now be made in detail to various examples of the present disclosure, which are illustrated in the accompanying drawings. While the present disclosure will be described in conjunction with various examples, it will be understood that the disclosure is not intended to limited to these examples. On the contrary, the present disclosure is intended to cover alternatives, modifications and equivalents, which may be included within the spirit and scope of the disclosure as defined by the claims. Furthermore, in the detailed description of the present disclosure, numerous specific details are set forth in order to provide a thorough understanding of the teachings of the present invention. However, it will be obvious to one of ordinary skill in the art that the present invention may be practiced without these specific details. In other instances, well known methods, procedures, and components have not been described in detail as not to unnecessarily obscure aspects of the present invention.

Figure 1:
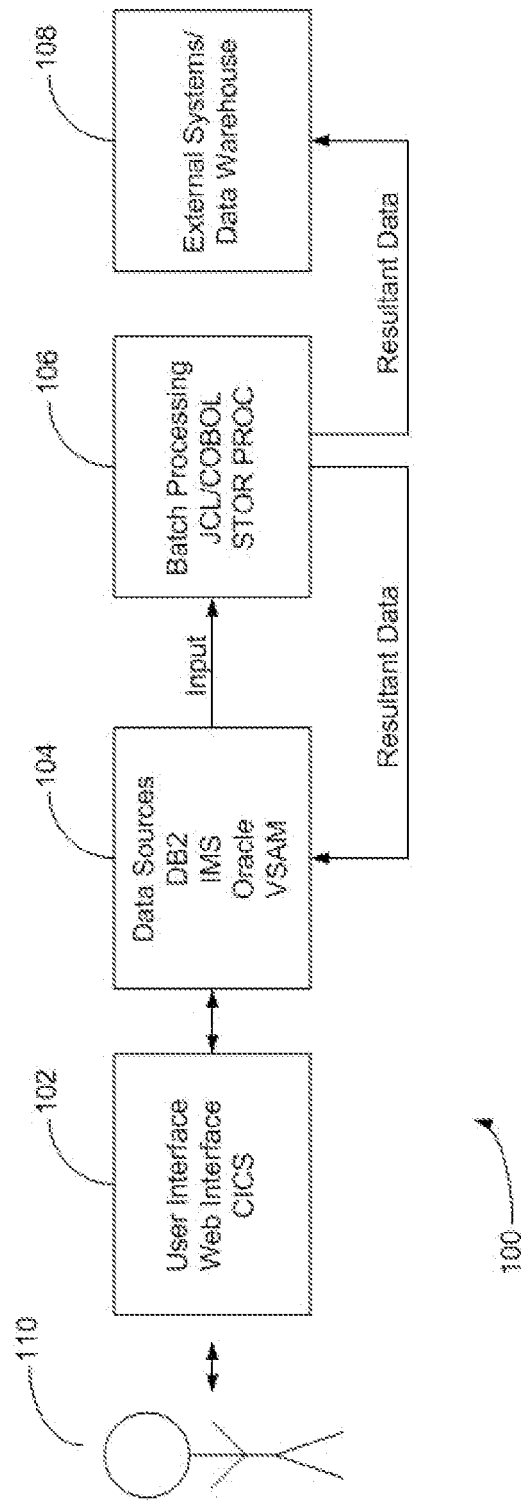
FIG. 1 is an overview diagram of typical prior art legacy modernization methodology, showing the data flow between the user, user interface, data sources, batch processing, and external systems/data warehousing within mainframe or other distributed processing platforms.
Figure 2:
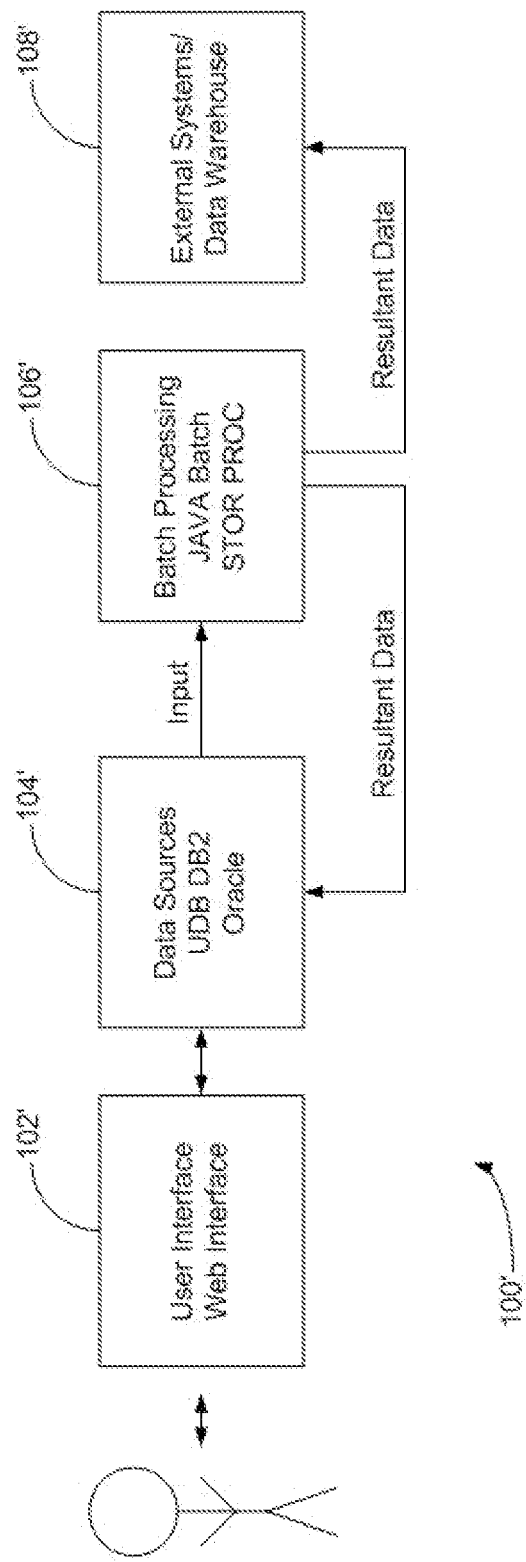
FIG. 2 is an overview diagram of typical prior art legacy modernization methodology similar to that of FIG. 1, where to improve batch processing on a mainframe computer, system components need significant rewriting of end-to-end applications from user interface and data sources to external systems and data warehousing.
Figure 3:
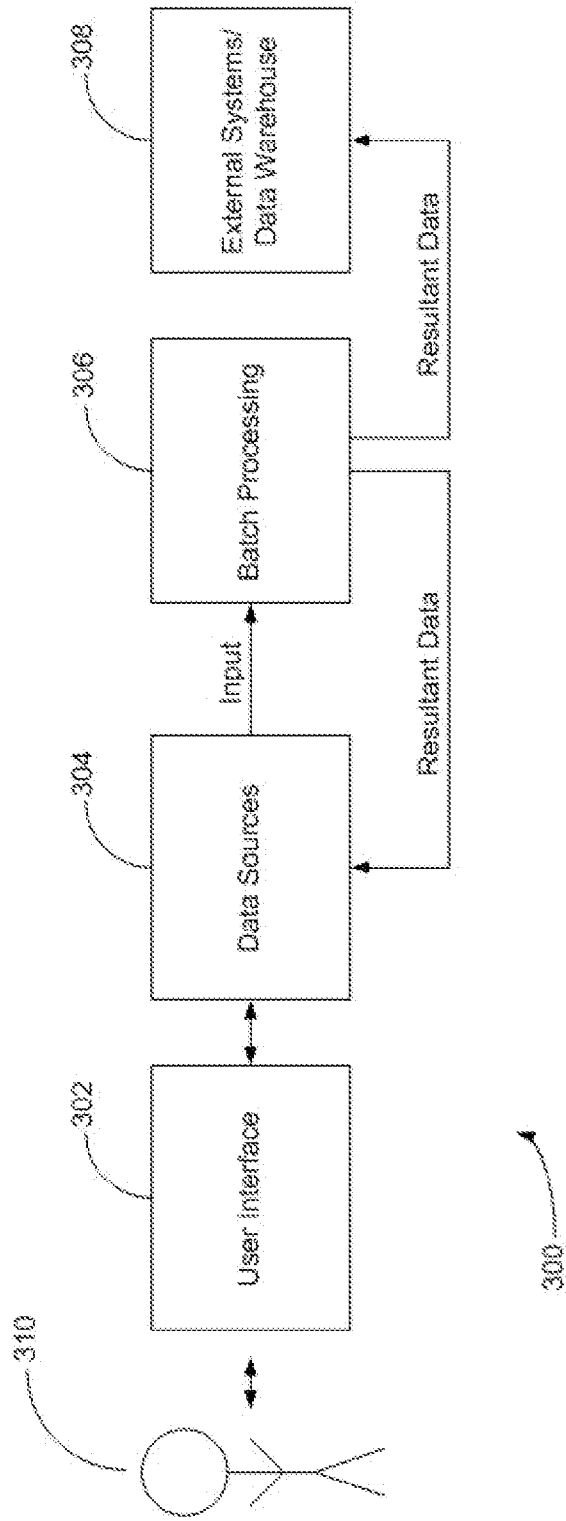
FIG. 3 is an overview diagram of prior art legacy modernization methodology, showing the data flow between the user, user interface, data sources, batch processing, and external systems/data warehousing within mainframe or other distributed processing platforms.

The system for migrating batch processing of legacy applications is seamlessly integrated into a current system, many of whose components are not changed at all. FIG. 3 shows a prior art overview flow diagram of a system 300 for moving information into and out of a sample batch processing unit of a legacy application within an existing mainframe or distributed computing platform. Data is entered and sent through the user 310 through an existing user interface system 302, which sends and receives data from data source programs 304 within the mainframe system 300. At the end of the day, data is collected from the data sources 304 by batch processing programs 306, which send data back to the data source 304, which may then transmit the data further to the user interface 302, and then to the user 310. Also, the resulting data from batch processing 306 may be sent to an external system 308, such as a data warehouse used for backing up all systems.

Figure 4:
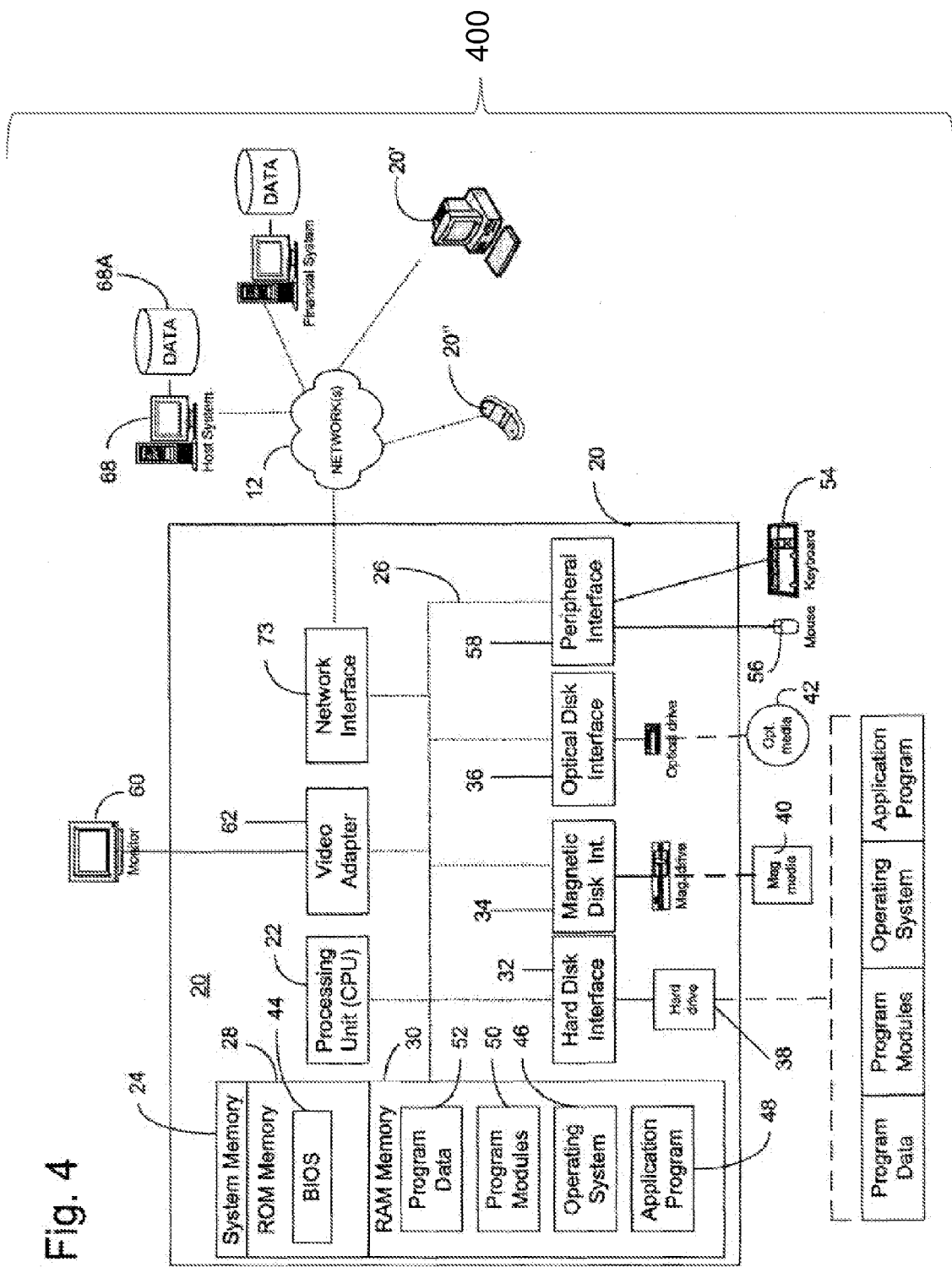
FIG. 4 illustrates, in block diagram form, components of an example computer network environment suitable for implementing the example economical migration of legacy application from mainframe platforms.

Referring now to FIG. 4, there is illustrated an example system 400 in accordance with one example of the present disclosure. In this example, system 400 includes a processing device 20, illustrated in the exemplary form of a mobile communication device, a processing device 20', illustrated in the exemplary form of a computer system, and a processing device 20 illustrated in schematic form, such as, for example, an appliance is provided with executable instructions to provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 4 may be embodied in any device having the ability to execute instructions such as, by way of example, an appliance, a personal computer, mainframe computer, personal-digital assistant ("PDA"), cellular telephone, tablet, e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read-only memory (ROM) 28 and/or random-access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random-access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed via a network connection, for example.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices not shown, such as, for example, speakers, cameras, printers, or another suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, sending and receiving information requests from a user, and sending and receiving data and programming related to batch processing, like those processes often done at the end of each business day.

Communications between the processing device 20 and the host system server 68 may be exchanged via a further processing device, such as a network router (not shown) that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 5:
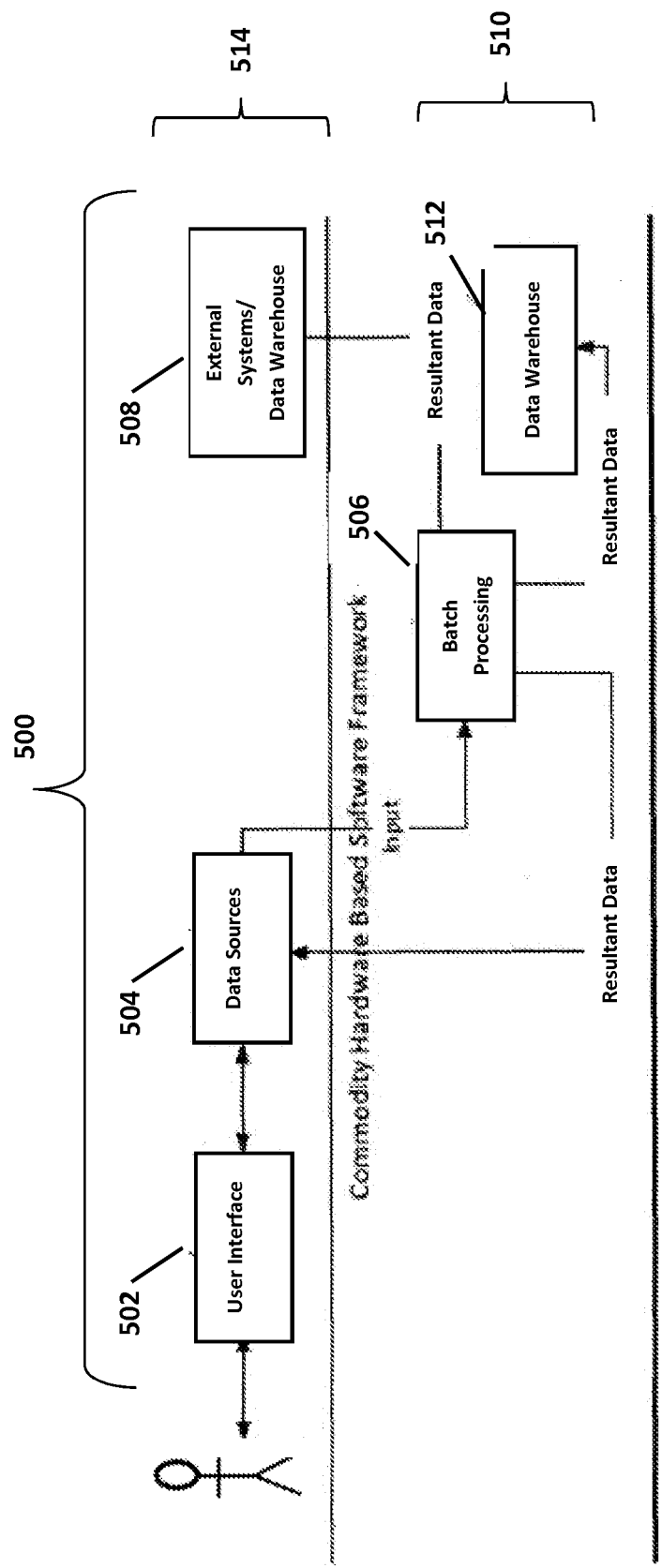
FIG. 5 is an overview diagram of typical legacy modernization methodology similar to that of FIG. 3, except that the batch processing and data warehousing is now performed on a commodity hardware-based software framework.

FIG. 5 depicts one embodiment of the invention, as the batch processing 506 is done within a commodity hardware-based software framework by the present invention. The processes still communicate data to each other in the same ways as it had done previously, as shown in FIG. 3. However in FIG. 5, the legacy system 514 includes user interface 502, data sources 504, and external systems/data warehouse 508 Batch processing 506 has been offloaded from the legacy system 514 to the commodity hardware-based software framework 516. Data is communicated from data sources 504 to batch processing 506. In one embodiment, data is transmitted using an Internet-based file transfer protocol (FTP). The resulting data is then returned to data sources 504 and external systems/data warehouse 508 within legacy system 514, where it will be used in the same manner, by an unaltered application. Resulting data may additionally be stored in data warehouse 512, located within commodity hardware based software framework 516. In this manner, batch processing 506 can typically be done faster and cheaper, than within existing legacy systems.

Figure 6:
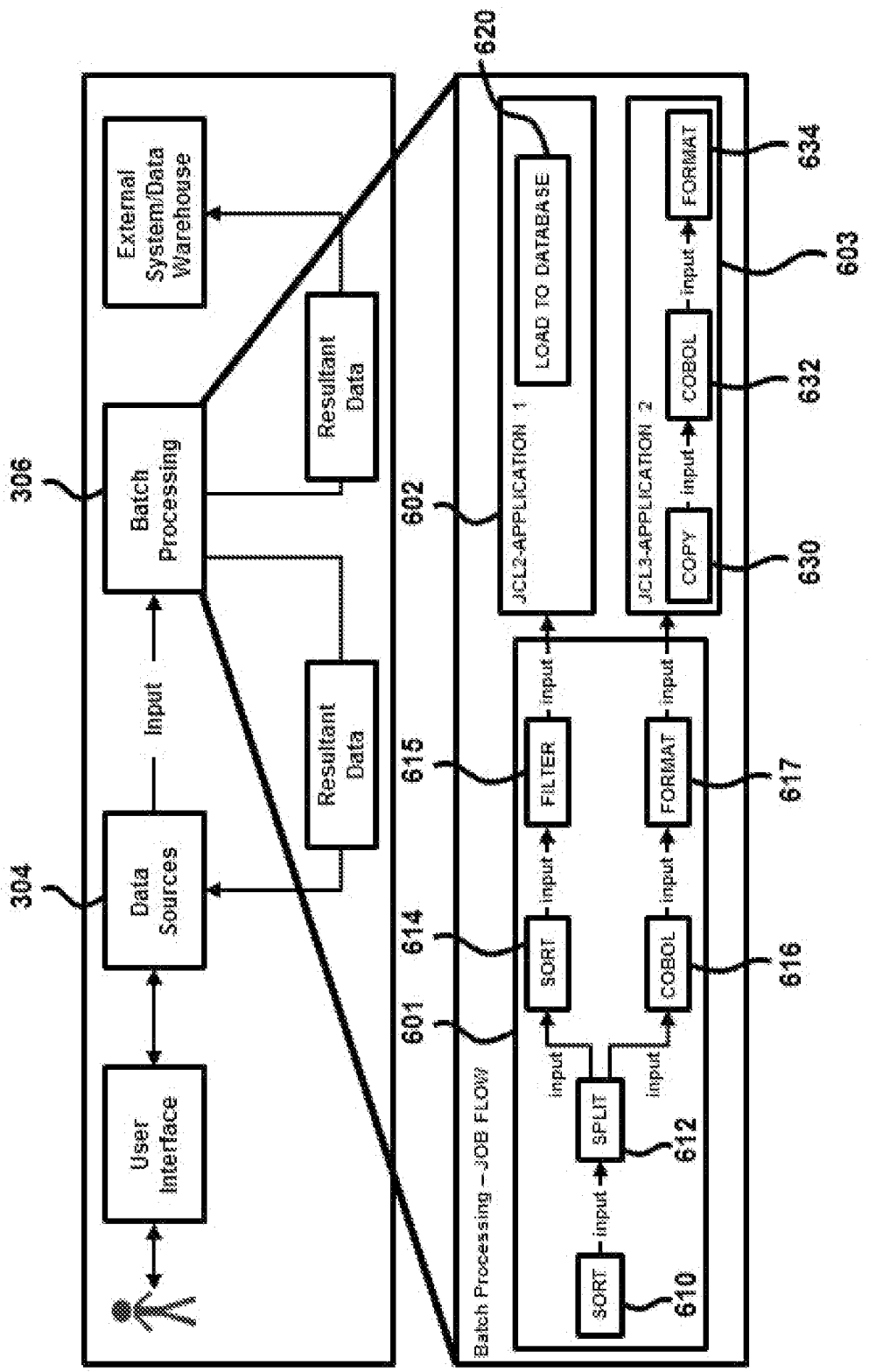
FIG. 6 is a diagram of a typical legacy platform, showing the detail of batch processing.

FIG. 6 shows a more detailed flow diagram of the data flow disclosed in FIG. 3. Batch processing 306 contains several applications, each one having its own programming to accomplish a particular purpose. Each of the applications are written in code abbreviated as "JCL," which refers both to Job Control Language, and a set of job control statements. In FIG. 6, JCL1 601, JCL2 602 and JCL3 603 are all batch processing subroutines that exist within a mainframe computer or distributed platform. JCL1 includes a sort component 610, which then provides data to split 612, that provides input to sort 614 and cobol 616. Sort component 614 provides data to filter 615. Cobol component 616 provides data to format 617. JCL2 includes a load to database program 620. JCL3 includes copy program 630 that provides input to cobol program 632, which in turn provides input to format program 634. JCLs may take information from data sources 304 or other JCLs running within the mainframe. Similarly, JCLs may output data to other JCLs or external systems, or data warehousing. For example, as shown in FIG. 6, JCL1 takes input from data sources 304, but provides input to JCL2 and JCL3.

Figure 7:
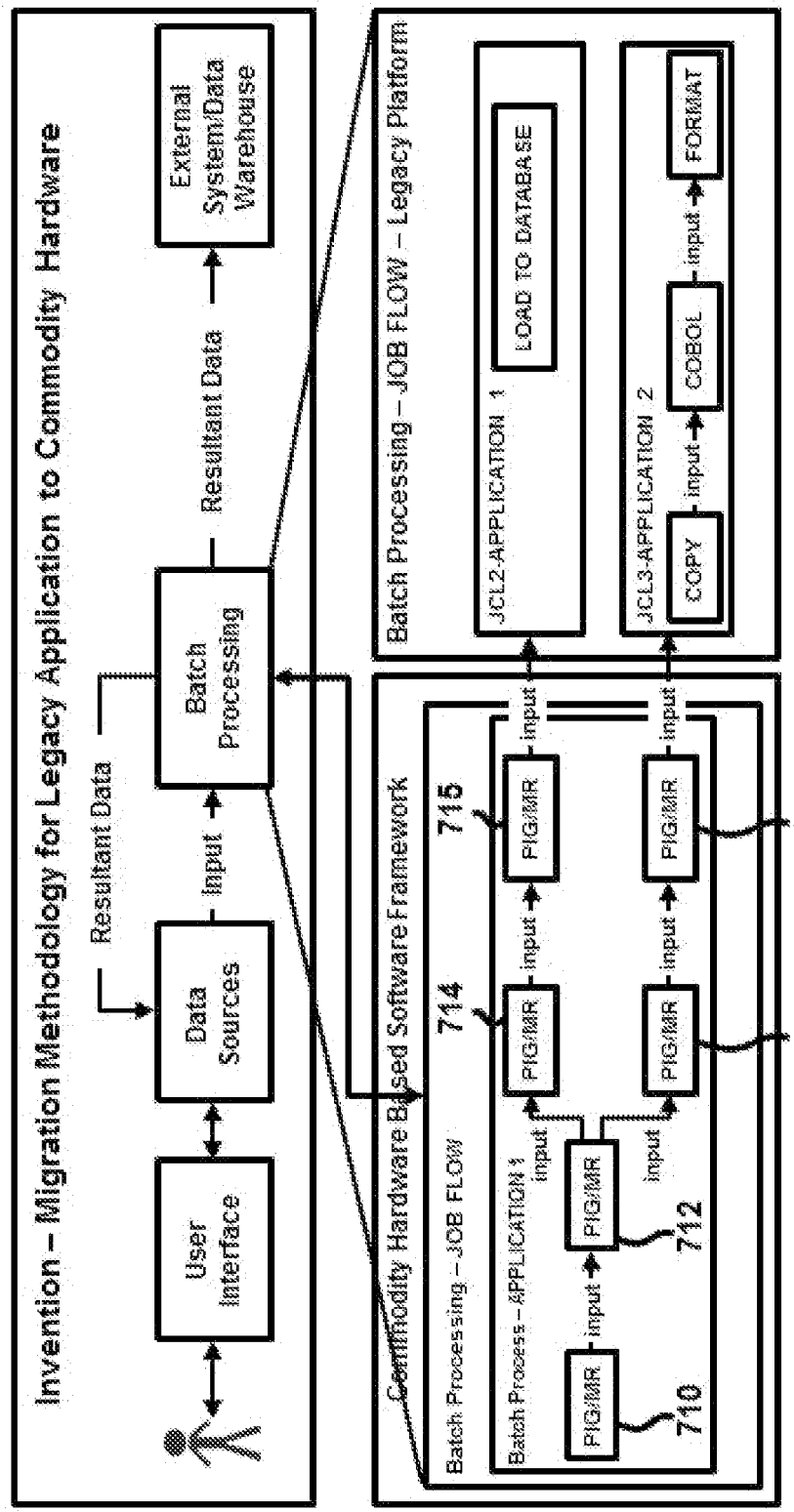
FIG. 7 is a diagram of a batch processing system, operating partially on a commodity hardware-based software framework, that is integrated into the data flow of a mainframe computer application.

FIG. 7, meanwhile, shows another embodiment of the invention disclosed in FIG. 5. The same batch processing units of legacy applications are used as in FIG. 6, except that one of the batch processing units is within commodity hardware-based software framework, where data is exchanged with the mainframe computer in an essentially seamless manner that is substantially transparent to the remainder of the system. In this embodiment, code is migrated from the mainframe computer to the commodity hardware using a suitable migration tool, such as, for example, an open-source program called Hadoop MapReduce to create programs for such applications, in PIG computer language, which is simpler and less expensive than rewriting the computer code. Hadoop MapReduce is open source software for distributed computing, available from The Apache Software Foundation. Another migration tool is HIVE, which is a data warehouse infrastructure that is also available from The Apache Software Foundation.

In one example implementation of the present disclosure, shown in FIG. 7, a systems engineer may first identify high MIPS legacy applications—namely, ones that require a great deal of mainframe computing capacity that are used on a daily basis, such as batch processing applications that run at the end of every business day. Alternatively or in addition to those applications, a systems engineer may identify applications with a larger batch processing window (i.e. require additional processing time). Then, the components of the batch processing applications are each identified and offloaded. These components are exemplified on FIG. 6, as sort 610 and 614, split 612, filter 615, cobol 616, and format 617. Each of these JCL operations are then offloaded onto the commodity hardware based software framework. In this example, the code of each JCL is migrated using Hadoop, to create MapResource programs for the same routines, created in PIG computer language. The migrated code is shown in FIG. 7 as PIG/MR 710, 712, 714, 715, 716, and 717. This dataflow language as been shown to be efficient in managing dataflow, and can result in a savings in processing costs. Benefits of this embodiment of the invention, in addition to offloading the batch processing components from the mainframe, may include being able to implement such a solution while maintaining the same job processing schedule, as deliverables are unlikely to be impacted. Furthermore, the efficient dataflow language used in the commodity hardware-based software framework will likely result in faster batch processing times.

Figure 8:
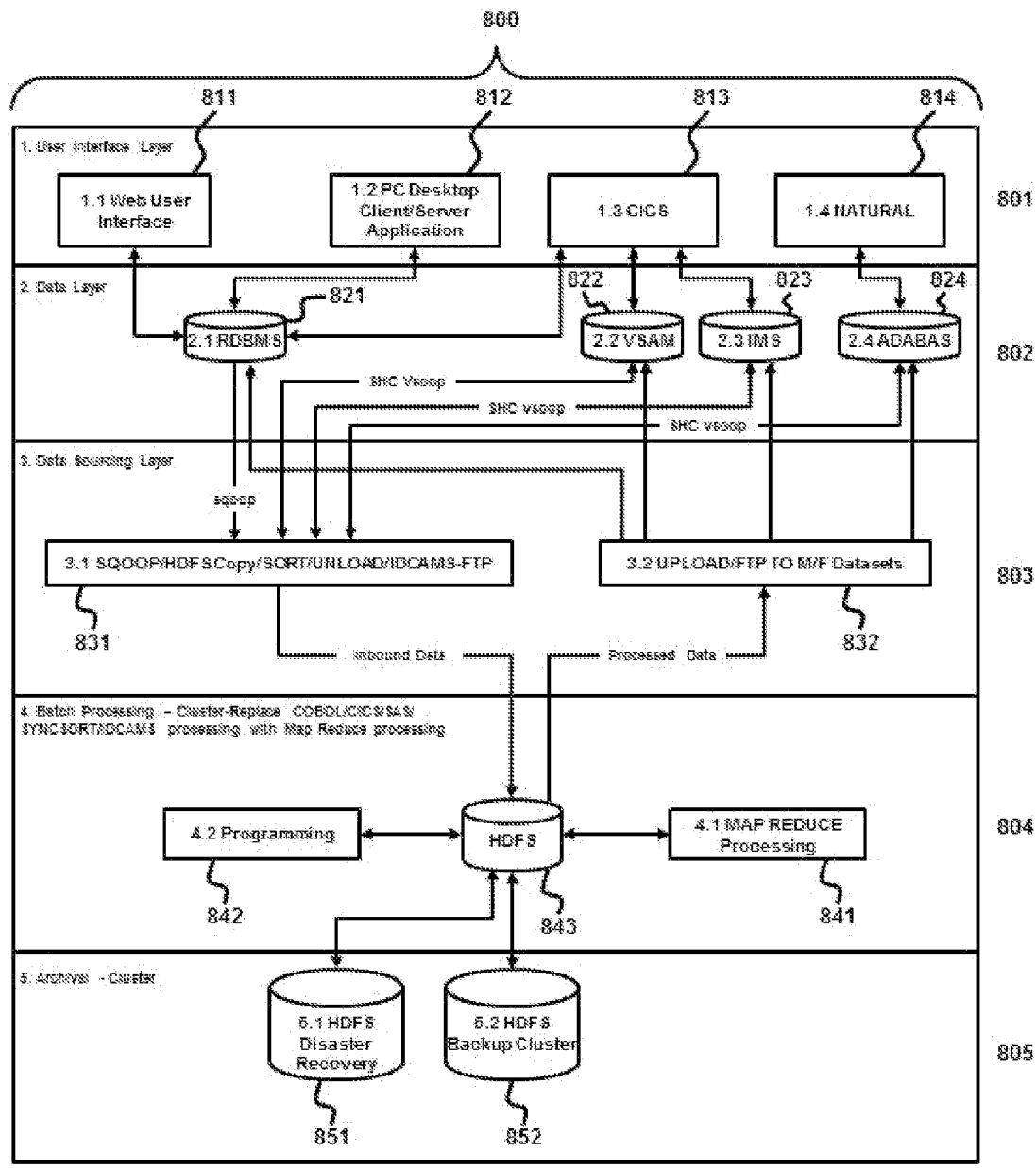
FIG. 8 is a detailed diagram of a software architecture for batch processing using a commodity hardware-based software infrastructure.

An embodiment of the invention exemplified in FIG. 8, shows in more detail the implementation of batch processing migration to a commodity hardware-based software framework, within an example of processes and applications that are present in a mainframe computer system. The layers of FIG. 8 represent different computer processes and applications that are likely to be encountered in legacy mainframe applications. Each layer is discussed in detail below.

The user interface layer 801 include systems and applications that are used in direct communication with the user, and is not expected to change when used in the present invention. As disclosed in FIG. 8, user interface layer 801 includes web user interface 811, PC/desktop client/server application 812, CICS 813 and NATURAL 814. Business applications will continue to perform in same environment. The present invention proposes migration of only batch processing without changing any user interfacing application. Although, one of ordinary skill in the art would recognize that the user interface application could be migrated if desired. The data will be sourced to invented platform for batch processing and resultant data will be reloaded in the current application format. The interfaces discussed below are helpful in understanding the invention and its implementation within existing mainframe computers and distributed platforms.

Web User Interface 811 accepts input and provides output by generating web pages which are transmitted via the Internet and viewed by the user using a web browser program. Many organizations run business processes with web based applications utilizing proprietary relational databases hosted on mainframe computers or distributed platforms.

PC Desktop Client/Server Applications 812 accepts input and provides output through use of programs that exist on the user's computer, or on a mainframe server and are accessible from a user's computer. The applications built using client/server technologies do not require any code change.

CICS 813 is a Customer Information Control System. This is a transaction server that runs primarily on IBM mainframe systems. CICS is a transaction manager designed for rapid, high-volume online processing, whose processing is mostly interactive (screen-oriented). The present invention does not require any code change to the CICS code base. Over 90 percent of Fortune 500 companies are reported to rely on CICS (running on z/OS) for their core business functions, along with many government entities.

NATURAL 814 is a user interface that has become effectively invisible to its users. Many legacy applications use ADABAS as a database on the back-end and developed with NATURAL on mainframe platforms.

Data layer 802 represents persistence databases and file systems. The business applications access data from this layer and present data to the user interface layer. The following different data sources constitute this layer:

RDBMS 821 is a Relational Database Management System. RDBMS is a database management system (DBMS) in which data is stored in tables and the relationships among the data are also stored in tables. The data can be accessed or reassembled in many different ways without having to change the table forms. In this instance, the system 800 uses a tool to extract and transfer data from RDBMS 821 into the invented batch processing software framework.

VSAM 822 is a Virtual Sequential Access Method. In the early 1970s, VSAM was introduced by IBM as a collection of three data set organizations—sequential, indexed, and direct-access, together with the access methods and utilities to be used on the large scale IBM operating systems. It only applies to data stored in direct access storage devices (DASD). This access method makes it easier for an application to execute an I/O operation (moving data between an I/O device and memory). In this instance the system 800 uses a tool to extract and transfer data from VSAM 822 into the invented batch processing software framework.

IMS 823 is an Information Management System, a joint hierarchical database and information management system with extensive transaction processing capabilities. The IMS database component stores data using a hierarchical model. In IMS, the hierarchical model is implemented using blocks of data known as segments. Each segment can contain several pieces of data, which are called fields. In this instance the system 800 uses an embodiment of the present invention to extract and transfer data from IMS 823 into the invented batch processing software framework.

ADABAS 824 is an acronym for Adaptable Data Base System, and is Software AG's primary database management system. ADABAS 824 is an inverted list database that is widely used in applications that require very high volumes of data processing and runs on mainframe platform. In this instance the system 800 uses an embodiment of the present invention to extract and transfer data from ADABAS into the invented batch processing software framework.

In addition, data layer 802 may also include other data sources, including SAS or data files created by third party tools and packages. SAS is an integrated system of software products provided by SAS Institute Inc. Other third party tools and packages used to create data files include Focus, Datastage, SAP, Peoplesoft, Oracle Financials, JD Edwards, Salesforce, and Essbase.

Data Sourcing Layer 803 is a layer of invented architecture, which represents a mechanism that will be used to exchange information between application data sources of data layer 802 and the batch processing framework 804. The layer comprises incoming data flow 831 and outgoing data flow 832. Incoming data flow 831 represents movement of data from various sources into the incoming layer of batch processing framework 804. This data transfer will happen through tools previously specified, or those used in the present invention. The data will be converted to text/tab separated format and moved to the batch processing framework 804 in Distributed Files System (DFS) format. Outgoing data flow 832 represents moving processed data by batch jobs into data sources of business applications in data layer 802. This process moves data from the batch processing framework 804 to the outgoing data flow 832 and then loads into data sources in data layer 802.

The batch processing layer 804 processes data in DFS format in HDFS 843. HDFS 843 is a Hadoop Distributed Files System, which is in communication with incoming data flow 831, outgoing dataflow 832, archival layer 805, R Programming 842 and MapReduce Processing 841. R Programming 842 processes data using MapReduce paradigm, for statistical programming framework used in R language. MapReduce Processing 841 processes bulk transaction data using PIG language which generates MapReduce programs. Batch processing layer 804 also creates several reusable used defined functions (UDFs), which will be used to replace financial calculations code written in Cobol. Most of the common processing components such as SORT, FILTER, GROUP BY, SPLITTING datasets will be accomplished through reusable code written in PIG and executed through SHELL Scripts, which can be scheduled through any scheduling software available in organizations.

Archival layer 805 of the invented architecture stores backup data for archival as well for disaster recovery. This data will be retained in DFS format that stores data on the computer nodes, providing a high aggregate bandwidth across the cluster. Archival layer 805 includes HDFS disaster recovery 851 and HDFS backup cluster 852. This invention, through its archival layer 805, presents mechanics to eliminate needs of tape systems normally used in IBM Mainframe systems for backups and disaster recovery, notably, node failures are handled automatically by the network. This invention reduces disaster recover and backup costs by utilizing low cost hardware infrastructure requirements, and by retaining data on data clusters.

There are many possible benefits to the present invention, including re-hosting batch processing on an economical architecture, reducing batch processing time (or window), archiving legal/compliance data on inexpensive storage, backing up all data on inexpensive storage, business intelligence (BI) applications with reduced latency, reducing extract, transform and load (ETL) costs, legacy modernization, and faster application development. In one embodiment, savings were realized of up to $600,000 per year, based on mainframe costs of $3,000-$7,000 per MIP per year.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A system for improved batch processing of data comprising:
    a commodity hardware-based software framework;
    one or more programming functions on the commodity hardware-based software framework that replace programming on one or more of a mainframe computer and a distributed platform, wherein the programming on the one or more of the mainframe computer and the distributed platform is part of an application running on the one or more of the mainframe computer and the distributed platform;
    a distributed file system that stores data on at least one computer node; and
    one or more software tools configured to move data from a data source on the one or more of the mainframe computer and the distributed platform to the distributed file system,
    wherein the one or more software tools are configured to move data from the distributed file system to the data sources on the one or more of the mainframe computer and the distributed platform, wherein data that would have been processed by the programming on the one or more of the mainframe computer and the distributed platform is instead processed by the one or more programming functions executed on the commodity hardware-based software framework, and wherein the data processed by the one or more programming functions is sent back to the application running on the one or more of the mainframe computer and the distributed platform.

2. The system of claim 1, wherein the commodity hardware-based software framework processes the data at a lower cost than the one or more of the mainframe computer and the distributed platform.

3. The system of claim 1, wherein the one or more programming functions are created using one or more of a PIG computer language, a HIVE migration tool, and a MapReduce program.

4. The system of claim 1, wherein the one or more programming functions are created without altering application logic.

5. The system of claim 1, wherein the one or more programming functions are designed so that node failures are automatically handled by the framework.

6. The system of claim 1, wherein the distributed file system is designed so that node failures are automatically handled by the framework.

7. The system of claim 1, wherein the data sources comprise one or more of the following: a relational management database system (RDBMS), a virtual sequential access method (VSAM), an information management system (IMS), an adaptable data base system (ADABAS), a statistical analysis system (SAS), and other data files created by third party tools or packages.

8. The system of claim 1, further comprising a storage cluster that is configured to provide archival and backup storage for application recovery.

9. The system of claim 1, wherein the distributed platform is a legacy distributed platform.

10. A method for improved batch processing of data comprising:
    migrating computer software for batch processing from a mainframe computer or a distributed platform to a commodity hardware-based software framework;
    replacing one or more programming functions on the mainframe computer or the distributed platform with software that runs on the commodity hardware-based software framework, wherein the one or more programming functions on the mainframe computer or the distributed platform are part of an application running on the mainframe computer or the distributed platform, wherein data that would have been processed by the one or more programming functions on the mainframe computer or the distributed platform is instead processed by the software running on the commodity hardware-based software framework;
    storing data on computer nodes in a distributed file system;
    moving the data from data sources on the mainframe computer or the distributed platform to the distributed file system using one or more software tools;
    moving the data from the distributed file system to the data sources on the mainframe computer or the distributed platform using the one or more software tools;
    processing the data by the software running on the commodity hardware-based software framework instead of processing the data by the one or more programming functions on the mainframe or the distributed platform; and sending back the data processed by the software running on the commodity hardware-based software framework to the application running on the mainframe computer or the distributed platform.

11. The method of claim 10, wherein the commodity hardware-based software framework is configured to process the data at a lower cost than the mainframe computers or distributed platforms.

12. The method of claim 10, wherein the one or more programming functions are replaced using one or more of a PIG computer language, a HIVE migration tool, and a MapReduce program.

13. The method of claim 10, wherein the one or more programming functions are replaced without altering application logic.

14. The method of claim 10, wherein the one or more programming functions are replaced so that node failures are automatically handled by the framework.

15. The method of claim 10, wherein the distributed file system is designed so that node failures are automatically handled by the framework.

16. The method of claim 10, wherein the data sources comprise one or more of the following: a relational management database system (RDBMS), a virtual sequential access method (VSAM), an information management system (IMS), an adaptable data base system (ADABAS), a statistical analysis system (SAS), and other data files created by third party tools or packages.

17. The method of claim 10, further comprising moving the data from the distributed file system to a storage cluster that is configured to provide archival and backup storage.

18. The method of claim 17, further comprising identifying batch processing components in legacy applications.

19. The method of claim 10, further comprising identifying high MIPS legacy applications or applications with a larger batch processing window.

* * * * *